United States Patent Office 3,483,469
Patented Dec. 9, 1969

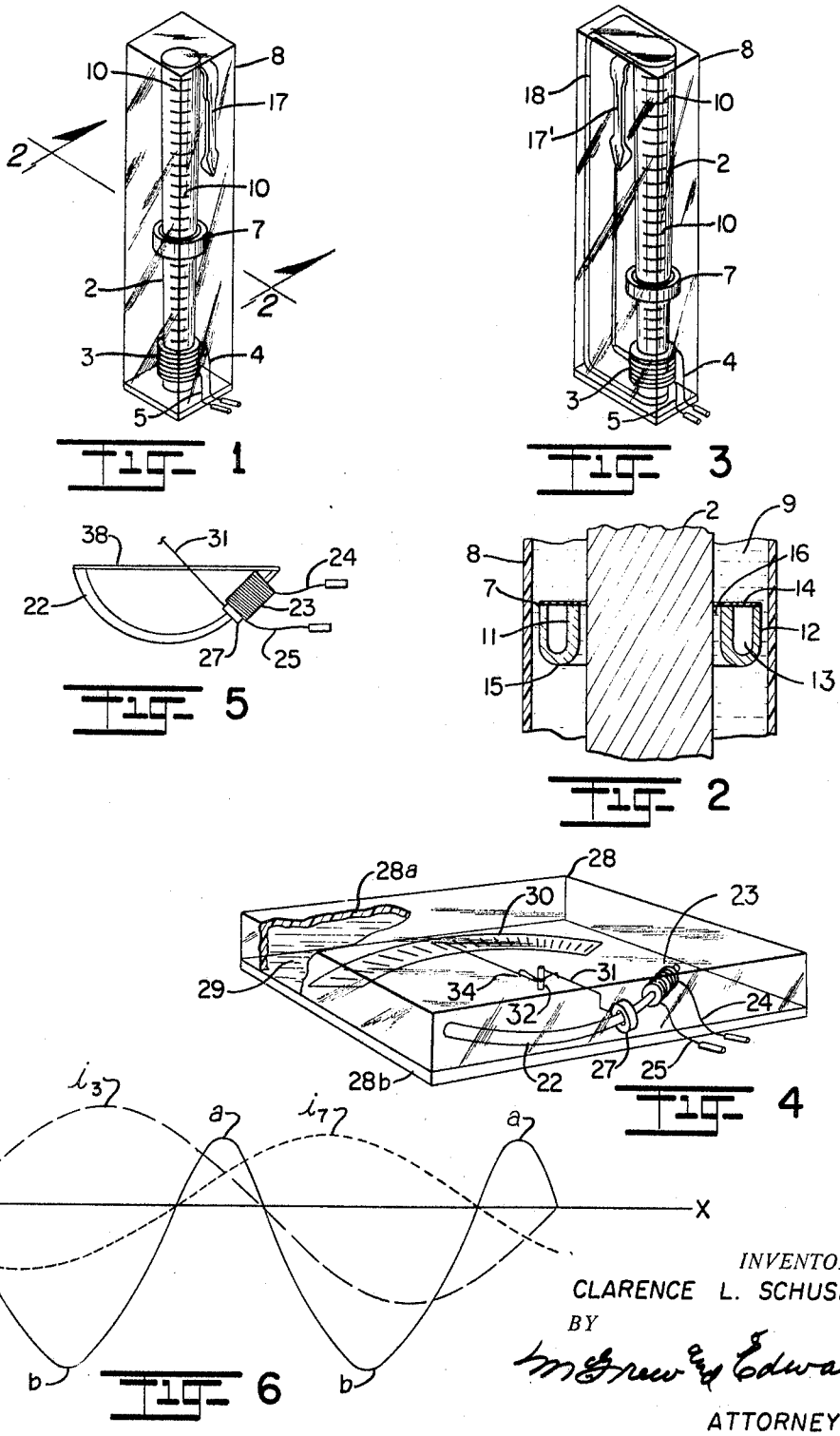

3,483,469
ELECTRICAL AC INDUCTION METER HAVING FLOATING RING MOVEMENT
Clarence L. Schuske, 1895 Alpine 16,
Boulder, Colo. 80302
Filed Mar. 14, 1966, Ser. No. 533,939
Int. Cl. G01r 1/20, 5/20, 11/30
U.S. Cl. 324—150                9 Claims

ABSTRACT OF THE DISCLOSURE

A highly sensitive, self-damped electrical AC induction meter has an uprightly disposed straight or horizontally disposed arcuate core of high permeability with an excitation coil wound about one end of the core together with a floating short-circuit conductive ring slidable along the core which is associated with a scale for measuring movement of the ring therealong. Current in the coil being measured induces a current in the ring in accordance with Lenz's law. The ring is immersed in a fluid to buoy it up and a hollow form has a thin membrane along one wall covering the hollow to adjust for temperature changes.

---

This invention relates to electrical instruments and more particularly to electrical meters for measuring alternating current and voltage.

The moving iron vane and the electrodynamometer are the two principal types of meters currently being used for the measurement of alternating current and voltage. The moving iron type in general includes a soft iron vane rotatably mounted within the magnetic field of an adjoining coil which moves the vane by magnetic attraction or repulsion. The electrodynamometer type generally includes movable coils pivotally mounted inside larger stationary coils so that a current in the stationary coils causes the movable coils to rotate toward a position of maximum flux linkages.

Such meters have a tendency to become damaged when inadvertently or accidentally overloaded or when dropped and the like. They also require special bearings to support the meter movement and are too bulky in size to permit carriage on the person such as in a pocket.

A meter embodying the present invention overcomes many of the disadvantages in the prior art by utilizing the combination of a core, a coil and a single turn electrically conductive member which adjoins and moves along the core. Alternating current in the coil induces a current in the conductive member and by magnetic forces according to Lenz's law moves it along the core.

An object of my invention is to provide a simple, durable, and easy to use meter for measuring alternating current and voltage which may be made in small compact sizes and conveniently carried in a pocket.

Another object of my invention is to provide a meter for measuring alternating current and voltage that is self-damped, very sensitive, and highly accurate.

A further object of my invention is to provide a meter for measuring alternating current and voltage that has a low internal impedance and can be used for measurements in the milliampere and millivolt range and above.

Still another object of my invention is to provide a novel A.C. meter that is suitable for use at high and low frequencies and is relatively free from temperature error.

Other objects, advantages and capabilities of the invention will become apparent from the following description taken in conjunction with the accompanying drawings wherein:

FIG. 1 is a perspective view of a meter embodying my invention drawn approximately to scale and reduced to about one-half the actual size having a straight core supported in an upright position, which is of a size particularly suitable for carrying in the pocket of the user;

FIG. 2 is a partial sectional view taken along line 2—2 of FIG. 1 drawn approximately to scale and enlarged several times actual size showing the interior of the movable member as hollow;

FIG. 3 is a perspective view of a meter similar to that shown in FIG. 1 drawn approximately to scale and reduced to about one-half the actual size, with a magnetic bridge joining the opposite ends of the core;

FIG. 4 is a perspective view of still another meter embodying my invention drawn approximately to scale and reduced to about one-half the actual size, having an arcuate core disposed on its side and partially broken to show the enclosure;

FIG. 5 is an elevational view of another magnetic circuit arrangement drawn approximately to scale and about one-half actual size having a magnetic bridge joining the opposite ends of the core suitable for use in place of the core and coil arrangement shown in FIG. 4; and FIG. 6 shows typical wave forms of the relationship of the current in the coil, the current in the movable member and the resultant magnetic force produced in the meters embodying my invention.

Referring now to the drawings, in FIGS. 1 and 2 there is shown a meter comprising an elongated core 2 of magnetic material disposed in an upright position and an electrical coil 3 wound on a bottom portion of the core in flux inducing relationship to the core. The coil 3 has electrical lead lines 4 and 5 the ends of which function as terminals for connecting electrical circuitry carrying alternating current to be measured to the meter. Alternating voltage is measured by this meter by placing a series resistor in the coil circuit and applying the voltage to be measured across said resistor. A movable member 7 of generally tubular electrically conductive material adjoins core 2 and more specifically encompasses or telescopes on the core and is slidable lengthwise of the core or reciprocatively movable thereon between a null or inactive position immediately above the coil 3 at the bottom of the core to an upper position of maximum deflection at the top of the core.

A container or enclosure 8 encloses the core 2 and coil 3 and has a bottom wall which supports the core 2 in a generally upright position as shown. The top wall of the container 8 serves as a stop for the movable member 7 in the event of overload. Lead lines 4 and 5 extend through the walls of the enclosure 8.

In the arrangement shown in FIG. 1 the enclosure 8 contains a fluid 9 which preferably has a density greater than air in which at least the core 2 and movable member 7 are immersed. The enclosure 8 may be entirely of a transparent material or have at least a portion formed of transparent material such as a durable plastic for visual inspection of the interior of the enclosure. An indicating scale 10 is preferably disposed on the core 2 substantially its lengthwise extent for measuring the movement of the movable member, all of which are visible from the exterior of the enclosure.

The core 2 is substantially straight and of generally circular cross section. This core is tapered characterized by an increasing cross section extending from its lower end immediately above the coil 3 to the opposite upper end of the core. Although it is understood that a cylindrical core of uniform cross section throughout its lengthwise extent may be suitable for some applications, in a preferred form as shown in FIG. 1 the core is tapered to bring about a linear response so that scale 10 may be divided in uniform increments. Other cross sections of the core are also suitable for certain applications, as for example, elliptical, rectangular and square cross sections.

A preferred form of movable member 7 is more fully illustrated in FIG. 2 and includes inner and outer walls 11 and 12 closed at the top and bottom to define an interior sealed space 13. A thin flexible membrane 14 is fitted in fluid sealed relationship between the tops of the inner and outer walls 11 and 12. The membrane 14 is sufficiently flexible to compensate for temperature changes which result in a change in the density of fluid 9 by changing the volume of air space 13 so the movable member 7 will rise to approximately the same level with variations in temperature. The bottom of the float member is tapered at 15 to reduce the resistance on the float member in returning to the bottom or null position due to the viscosity of the fluid.

The movable float member 7 is essentially in the form of a closed loop conductor or single turn coil having a central aperture which fits over and encompasses the core 2 so that its inner wall 11 and the core 2 define an annular gap therebetween designated 16. A clip 17 is shown attached to the outer wall of enclosure 8 making the assembly suitable for attachment to and carriage in the pocket of a user.

In FIG. 3 there is shown a meter having a tapered core 2, coil 3, lead lines 4 and 5, movable member 7, enclosure 8 and scale 10 constructed and arranged in a manner similar to that shown in FIGS. 1 and 2. A clip 17' is shown attached to the outer wall of enclosure 8. In this arrangement there is further provided a magnetic bridge member 18 which joins the top and bottom of the magnetic core 2 to form a closed-loop magnetic circuit. This magnetic circuit has been found to provide greater deflection of the movable member 7 than the form shown in FIG. 1 which may be preferable for some applications.

It is understood that other forms of buoyant movable members may be provided. For example, the movable member 7 may be made solid rather than hollow between the inner and outer walls 11 and 12. When this is done a material of low density such as foamed plastic may be used to provide the buoyant effect in the fluid. A conductive material which is foamed or formed with air spaces between conductive particles also provides reduced density and would be suitable. When any of the above mentioned float members are utilized the relationship of the densities of the fluid and the float member is such that the weight of the float member is only slightly greater than that of the displaced fluid in which it is submerged and is therefore buoyed up to overcome a substantial amount of the influence of gravity which improves the response of the movable member.

After the movable member or float member 7 has been elevated along the core due to the alternating current in coil 3, the float member has sufficient weight with respect to the fluid in which it is immersed to return it to the null position under the influence of gravity. A suitable liquid for the meters shown in FIGS. 1 through 3 will have a low viscosity, as for example acetaldehyde.

Although the buoyant effect on the movable member 7 is preferred in the meters shown in FIGS. 1, 2 and 3, it is understood that a solid movable member in air is also workable and may be used for some applications.

Referring now to FIG. 4 there is shown another meter having an elongated core 22 of magnetic material disposed on its side in a generally horizontal plane and an electrical coil 23 wound on an end portion of the core in flux inducing relationship to the core. Electrical lead lines 24 and 25 extend from the coil for connection to electrical circuitry carrying alternating current to be measured to the meter. A movable member 27 of electrically conductive material adjoins and more specifically encompasses or reciprocatively telescopes on the core and is slidably movable lengthwise of the core between a null position at one end of the core adjacent the coil 23 to a position of maximum deflection at the opposite end of the core.

A container or enclosure 28 surrounds the core 22 and coil 23 and movable member 27. The enclosure 28 has top and side walls forming an upper portion 28a preferably constructed of a transparent plastic material for visual inspection of the interior and a bottom wall portion 28b which may be of the same material as 28a or a heavier material and need not necessarily be transparent. The bottom wall 28b has means which supports the core 22 in a generally horizontal position above the upper surface of the bottom wall 28b at sufficient distance to allow the horizontal movement of movable member 27 on the core 22. Lead lines 24 and 25 extend through the enclosure 28.

Enclosure or container 28 is shown as containing a fluid 29. An indicating scale 30 is disposed on an upper surface of the bottom wall 28b. Between scale 30 and core 22 a needle or pointer 31 is pivotally mounted on a pivot 32. Needle 31 is coupled at one end to movable member 27 and is movable over the scale 30 at its opposite end.

Core 22 is shaped in the form of a circular arc along its lengthwise extent having its center at the pivot 32 so that movable member 27 is rotatably supported by pivot 32 and needle 31 so as to move along core 22 in a substantially circular path. Needle 31 is biased by a suitable biasing means such as a spring 34 to return and hold the movable member 27 in the null or inactive position adjacent the coil 23 when the coil is de-energized.

Core 22 is illustrated as tapered characterized by an increasing cross section extending from the end adjacent coil 23 to the opposite end of the core distant from the coil. The cross section is generally circular but may have different cross sections such as oval, square or rectangular as previously discussed. The tapered core as shown provides a substantially linear response as previously described.

An alternative magnetic circuit arrangement for the meter shown in FIG. 4 is illustrated in FIG. 5. This meter includes a core 22, coil 23, lead lines 24, 25, movable member 27, and pointer 31 arranged in the same manner as FIG. 4. There is further provided a magnetic bridge 38 which joins the ends of core 22 to form a closed loop magnetic circuit. This arrangement provides increased deflection in the meter as has been described with reference to FIG. 3.

The fluid 29 contained in enclosure 28 may be some applications be only air, in which case the movable member 27 would be solid without the buoyant effect previously described with reference to FIG. 2. However, in a preferred embodiment the contained fluid has a density greater than air, in which case the immersed movable member 27 is hollow having inner and outer walls which define an air space therebetween or solid with a float, or foamed conductive material in a manner described with reference to FIG. 2.

The float member 27 immersed in a fluid 29 having a density greater than air is arranged so that the weight of the float member is approximately equal to the weight of the fluid which is displaced so that movable member is substantially weightless. Under these conditions movement of the enclosure 28 to different orientations will not affect the position of the movable member and thus the pointer 31 will not be sensitive to meter orientation.

The general operation of all of the above described meters will now be described with particular reference to FIG. 6 showing typical curves plotted on an $x$, $y$ axis for the current in the coil, the movable member and the resulting magnetic forces therebetween for said meters. For the purposes of explanation, $i$ represents instantaneous current and $\phi$ represents a magnetic flux produced by the current $i$. Subscripts are applied to the current and flux which correspond to structure in the drawings. For example, $I_3$ represents the current in coil 3 and $\phi_3$ represents the flux produced by $i_3$. The general operation will hereinafter be described with reference to the structure of FIGS. 1, 2 and 3 but it is understood that the following description of operation applies equally to the meters shown in FIGS. 4 and 5.

Electrical lead lines 4 and 5 connected to an alternating current or voltage to be measured apply an alternating current $i_3$ in coil 3 which sets up a flux $\phi_3$. This flux induces a current $i_7$ in the movable member or the single turn coil 7 which flows in the opposite direction to $I_3$. Current $i_7$ brings about a flux $\phi_7$ which opposes the flux in accordance with Lenz's law and a magnetic force designated F is produced which is proportional to the product of $\phi_3$ and $\phi_7$ which moves coil 7 between a null position adjoining coil 3 to a position of maximum deflection at the top of core 2. The equation for the force is written as:

$$F \propto \phi_3 \phi_7$$

Since the respective currents and fluxes are proportional, this equation can be writen using $i_3$ and $i_7$ so that:

$$F \propto i_3 i_7$$

The relationship of this force between coil 3 and coil 7 is represented geometrically in FIG. 6 wherein $i_3$ is shown in long dashed lines and is the reference current. Current $i_7$ is shown in short dashed lines and lags current $i_3$ by a phase angle because of the inductance in coil 7. Current $i_7$ peaks at a lesser value than $i_3$.

The resultant of the product of $i_3$ and $i_7$ or force is represented by a full line with loops $a$ designating the positive portion of the cycle representing an attractive force and with loops $b$ designating the negative portion of the cycle representing a repulsion force. The product of a positive and a negative current throughout the major portion of the cycle produces a net effect of repulsion.

This relationship between force and currents also may be expressed mathematically as:

$$F = i_3 i_7 \frac{\partial M}{\partial X}$$

where:

F=force between coil 7 and coil 3
$i_3$=current in coil 3
$i_7$=current in coil 7
M=mutual inductance
X=distance between coil 7 and coil 3

The inertia of coil 7, the fluid in which it is immersed, and the net effect of repulsion as above described contribute to a meter which is substantially self-damped or which does not vibrate materially during its movement along the core.

Reference will now be made to some of the physical properties of the meters shown which are included for purposes of fully describing particular embodiments.

Referring first to the core, it may be formed of powdered, wrapped, or solid magnetic materials preferably of high permeability. Suitable high-permeability materials are tabulated as follows:

| Material | Permeability at B=20 gausses | Maximum permeability |
| --- | --- | --- |
| 78 Permalloy | 8,000 | 100,000 |
| 4-79 Permalloy | 20,000 | 100,000 |
| Mu metal | 20,000 | 100,000 |
| Supermalloy | 100,000 | 80,000 |

The symbol for permeability is $\mu$ and is measured in lines per square inch per amp-turn.

The clearance space between the core and movable member designated 16 in FIG. 2 has a preferred range from 0.001 inch to 0.25 inch.

The movable or float member is constructed of a good electrically conductive material such as aluminum, beryllium or copper. The fluid having a density greater than air may be liquid such as water, alcohol or a combination of two or more liquids.

As described with reference to the drawings, the meters illustrated herein are drawn approximately to scale. The approximate dimensions of the core 2 shown in FIGS. 1, 2 and 3 are as follows:

| | Centimeters |
| --- | --- |
| Maximum diameter | 1.3 |
| Minimum diameter | 1.0 |
| Total length | 11.0 |
| Length along scale | 9.9 |

The minimum current range for a meter of these dimensions is about 150 milliamperes.

The approximate dimensions of the core 22 shown in FIGS. 4 and 5 is as follows:

| | Centimeters |
| --- | --- |
| Maximum diameter | 0.35 |
| Minimum diameter | 0.20 |
| Total length | 15 |
| Length along scale | 10 |

The minimum current range for a meter of these dimensions is about 50 milliamperes.

The internal impedance of the meter is in the range of 10 to 20 ohms making the meter suitable for milliampere measurements. However, by putting shunt resistors of selected resistance in the stationary coil circuit such as a connection to one of the lead lines, a preselected range of current above the milliampere range can be measured with meters embodying my invention.

While it is understood that the above core dimensions may be changed for particular applications, they are included as representative of the dimensions I have found for a workable embodiment of compact size.

Several variables in the meter structure are found from an analysis of the above described meters to meet particular requirements such as: the radius of the stationary coil; the turns of the stationary coil; the radius of the movable member; the conductivity of the movable member; the annular gap between movable member and core; and the core permeability. The magnetic bridge is effective in increasing the range of deflection and improved sensitivity.

Variations in the location of the scale in all of the meters described are contemplated. For example, scale 9 may be formed in a wall of the enclosure 8 rather than on core 2. Scale 30 may be formed in the upper transparent wall of enclosure 28. The transparency of the enclosure may be varied by having only that portion transparent which is necessary to view the action of the interior scale, movable member or indicating needle and scale.

From the foregoing it is apparent that a meter embodying the present invention offers several distinct advantages over prior instruments. This meter, inter alia, has a low internal impedance in the range of 10 to 20 ohms, it is portable, it is of rugged construction both electrically and mechanically, it is very sensitive, self-damped, inexpensive to manufacture, it is not affected by different orientations, and it has an approximate linear response.

I claim:

1. An electrical induction meter for measuring alternating current and voltage comprising an elongated substantially straight core of magnetic material adapted to be disposed in an upright position, a coil at the lower end of the core in flux inducing relation to said core, a short-circuit floating generally tubular ring of electrically conductive material having a thin, flexible membrane forming a wall portion to change the volume of the air space in the tubular ring with temperature changes, said ring encompassing said core and slidable lengthwise thereof to provide a gap between the core and said ring, an enclosure containing a fluid and encompassing said ring and at least a portion of said core to immerse said ring and said portion of the core therein, the weight of the ring being only slightly greater than the weight of the fluid it displaces, an indicating scale for measuring movement of said ring, and said coil having electrical lead lines for applying a voltage and current being measured to said coil to produce a current in said coil whereby a current is induced in said ring for movement of said ring by magnetic forces upwardly along the core away from the coil and return the ring to a null position by gravity forces when the current is removed from the coil.

2. A meter as set forth in claim 1 wherein said core is of a magnetic material having a permeability above about 8,000 at about 20 gausses.

3. A meter as set forth in claim 1 wherein a U-shaped bridge of magnetic material joins the opposite ends of said core.

4. A meter as set forth in claim 1 wherein said gap between said core and said ring is in the range from about 0.001 inch to about 0.25 inch.

5. An electrical induction meter for measuring alternating current and voltage comprising an elongated substantially straight core of magnetic material and of generally a circular cross-section adapted to be supported in an upright position, a coil at the lower end of the core in flux inducing relation to said core, said core being tapered along its length characterized by an increasing cross-section from adjacent the core to the opposite end of the core a short-circuit floating generally tubular ring of electrically conductive material and of a relatively broad cross-sectional tubular area encompassing said core and slidable lengthwise thereof to provide a gap between the core and said ring, an enclosure containing a liquid encompassing said ring and at least a portion of said core, the weight of said ring being slightly greater than the weight of said liquid it displaces, an indicating scale on the core for measuring movement of said ring, and said coil having electrical lead lines for applying a voltage and current being measured to said coil to produce a current in said coil whereby a current is induced in said ring, said ring being moved upwardly from a null position by magnetic forces along the core away from the coil a distance from the coil in direct relation with the current in the coil and return the ring to the null position by gravity forces when the current is removed from the coil.

6. A meter as set forth in claim 5 wherein the float member is tapered laterally of its underside to reduce resistance due to the viscosity of said fluid.

7. An electrical induction meter for measuring alternating current and voltage comprising an elongated core of magnetic material and generally arcuate along the lengthwise extent, a coil in flux inducing relation to said core, said core being tapered along its length being characterized by an increasing cross-section from adjacent the coil toward the opposite end of the core, a short circuit floating generally tubular ring of electrically conductive material reciprocatively telescoping on said core to provide a gap therebetween, an enclosure containing a fluid having a density greater than air and encompassing said ring and at least a portion of said core, to immerse said ring and said portion of the core therein, the weight of the ring being approximately equal to the weight of the fluid it displaces, said enclosure having a transparent portion for visual inspection of at least a portion of the interior of the enclosure, an indicating scale supported by said enclosure for measuring movement of said movable member, a pivotally supported needle coupled to said ring and having a portion in proximity to said scale, said indicating needle biased to return the movable member to a null postion adjacent said coil, and said coil having electrical lead lines for applying a voltage and current being measured to said coil to produce a current in said coil whereby a current is induced in said ring for movement of said ring by magnetic forces along the core away from the coil a distance from the coil in direct relation with the current in the coil while said ring and said scale are visible from the exterior of the enclosure.

8. A meter as set forth in claim 7 wherein a straight bridge of magnetic material joins the opposite ends of the core.

9. A meter for measuring alternating current and voltage comprising an elongated core of magnetic material, a coil in flux inducing relation to said core, a movable float member of electrically conductive material encompassing said core and slidable lengthwise thereof to provide a gap between the core and said member, an enclosure containing a fluid encompassing said movable member and at least a portion of said core, the weight of said float member being slightly greater than the weight of said fluid it displaces, an indicating scale for measuring movement of said movable member, and said coil having electrical lead lines for applying a voltage and current being measured to said coil to produce a current in said coil whereby a current is induced in said movable member for movement of said movable member by magnetic forces along the core away from the coil, said float member being hollow and having a thin membrane along one wall for covering the hollow interior.

References Cited
UNITED STATES PATENTS

| | | | |
|---|---|---|---|
| 426,065 | 4/1890 | Rae | 324—145 |
| 1,711,285 | 4/1929 | Petersen | 335—226 |
| 2,024,966 | 12/1935 | Chilowsky | 324—145 X |
| 2,180,473 | 11/1939 | Lange | 324—150 X |

FOREIGN PATENTS

| | | |
|---|---|---|
| 230,540 | 8/1909 | Germany. |
| 1,089,881 | 9/1960 | Germany. |

RUDOLPH V. ROLINEC, Primary Examiner

J. J. DEVITT, Assistant Examiner

U.S. Cl. X.R.

324—144; 336—75, 79